Dec. 11, 1951     C. A. BIRKEBAK     2,578,124
MACHINE FOR ASSEMBLING PISTONS TO
WRIST PINS AND CONNECTING RODS
Filed June 18, 1949     5 Sheets-Sheet 3

INVENTOR.
CHRISTIAN A. BIRKEBAK
BY Thomas J Hughes
ATTORNEY

Dec. 11, 1951 — C. A. BIRKEBAK — 2,578,124
MACHINE FOR ASSEMBLING PISTONS TO WRIST PINS AND CONNECTING RODS
Filed June 18, 1949

INVENTOR.
CHRISTIAN A. BIRKEBAK
BY Thomas J. Hughes
ATTORNEY

Dec. 11, 1951 C. A. BIRKEBAK 2,578,124
MACHINE FOR ASSEMBLING PISTONS TO
WRIST PINS AND CONNECTING RODS
Filed June 18, 1949 5 Sheets-Sheet 5

INVENTOR.
CHRISTIAN A. BIRKEBAK
BY Thomas J. Hughes
ATTORNEY

Patented Dec. 11, 1951

2,578,124

UNITED STATES PATENT OFFICE 2,578,124

MACHINE FOR ASSEMBLING PISTONS TO WRIST PINS AND CONNECTING RODS

Christian A. Birkebak, Detroit, Mich.

Application June 18, 1949, Serial No. 99,958

9 Claims. (Cl. 29—33)

This invention relates to an improved automatic power driven machine for the mass production assembly of wrist pins to pistons and connecting rods of the type generally used in automotive engines.

An object of this invention is to provide my improved automatic power driven machine with a device that, in one operation of a few seconds, will insert the wrist pins in the pistons' bosses and wrist pin bearing of connecting rods, thus connecting the rod to the wrist pin and the latter to the piston.

Another object of the invention is to provide my machine aforesaid with a pair of oppositely disposed units that cut predetermined lengths of wire fed thereto, form same into retaining rings and quickly force the latter into end engagement (within the piston bosses) with the wrist pins so as to retain or lock the pins against displacement relative to said bosses.

Another object of the invention is to provide my machine with a rotating member having a plurality of radially disposed work holding receptacles or chambers for carrying the parts above mentioned to be assembled, whereby upon rotation of the member, each receptacle thereof pauses briefly first, at the station where the above mentioned device is located and subsequently at the station at which the aforementioned units are located at which stations the operations heretofore mentioned are effected. Thus complete assembly of each piston to its connecting rod and wrist pin is thereby accomplished for each receptacle in the matter of approximately four seconds. Continuous production of assembled units is maintained as long as the rotated receptacles are kept filled with parts.

Another object of the invention is to provide each receptacle with an ejector device for automatically discharging the completed assemblies therefrom.

Still another object of the invention is to so synchronize the operational movements of the aforesaid device, units and ejector with that of the rotating member that a continuous operation is effected to accomplish the assemblies.

Further objects and advantages of my invention will become apparent as the description proceeds.

As illustrated in the drawings (Fig. 1) the numeral 10 designates the frame of the machine. A prime mover (not shown) is suitably coupled to the power input shaft 11, which latter member through suitable gearing (not shown) operably connects gear 12, carried by shaft 13, with gear 14 keyed to shaft 15, the latter rotating on the ball bearings 16. Also keyed to shaft 15 is the gear 17, which meshes with gear 18 carried by shaft 19 to turn the latter on the balls 20. To the ends of shaft 19 sprockets 21 are suitably connected for driving engagement with sprocket chains 22 (Figs. 1 and 2) for a purpose later to be described.

Also keyed to shaft 15 is the Geneva approximate locator arm 23 and associated indexing arm 24, the latter member having secured therethrough the indexing pin 25 one end of which supports roller 26, the arm 23 and roller 26 upon rotation being adapted in the well known manner to engage the slots 27 of index wheel 28 which is secured to tubular shaft 29, within which the aforesaid shaft 19 rotates. Shaft 29 in turn is rotatably supported in the frame 10 by roller bearings 30.

Suitably keyed to tubular shaft 29, so as to rotate therewith, is the work wheel 31 (Figs. 1 and 11) which has formed integrally therein a plurality of cup-shaped supports 32 for the reception of the cylindrical-shaped work holding receptacles 33. The opposed sides of each of the members 32 and 33 are provided with U-shaped slots 34 (see Figs. 11 and 13) aligned on the transverse axes of said supports and receptacles. The receptacles 33 are of identical construction and a description of one of them therefore is a description of the others. Each receptacle is adapted to receive and hold a piston 35, which is inserted upside down therein so as to align the bores of the wrist pin bearings thereof with the slots 34 and thus present a continuous passage through the walls of the support, the receptacle and the piston, all for a purpose presently to be described.

Figure 1:
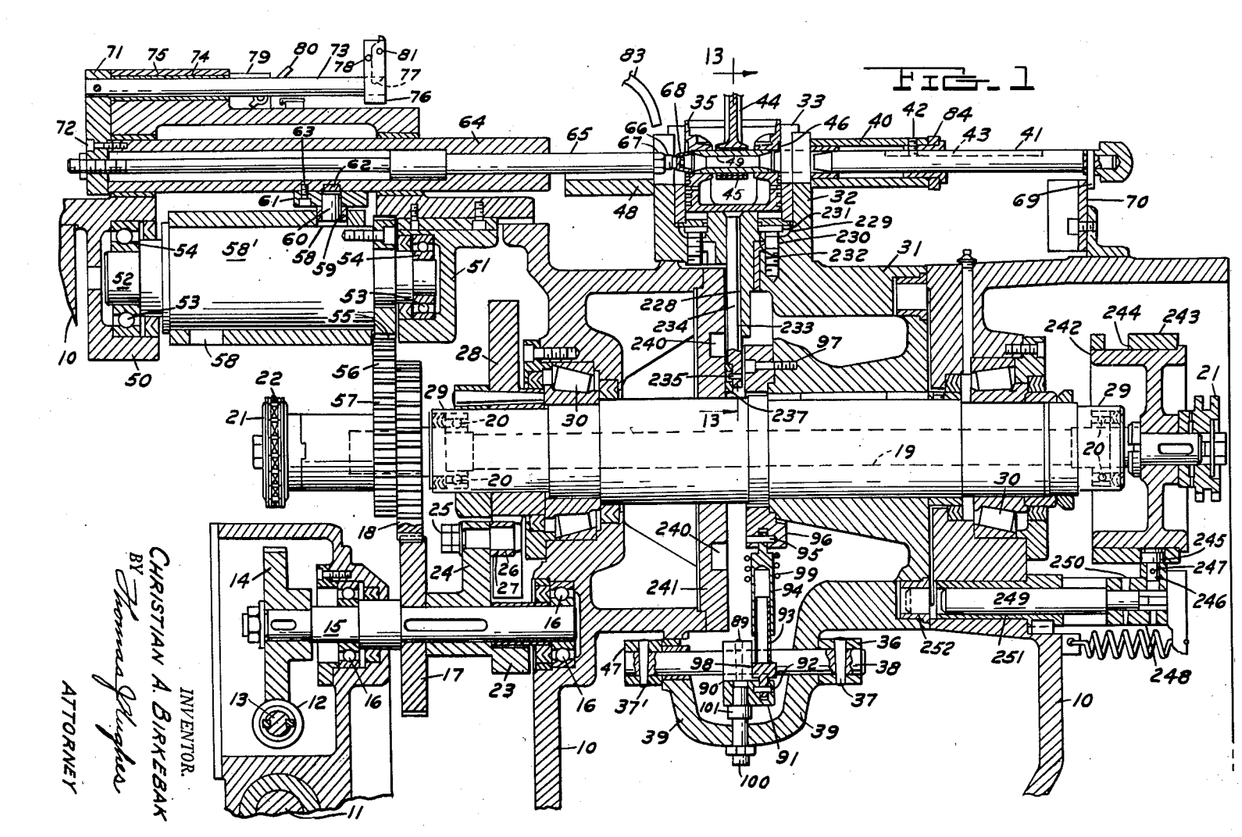
Figure 1 is a cross-sectional view of that part of my machine taken on the line 1—1 of Fig. 11.
Figures 9, 11, 13:
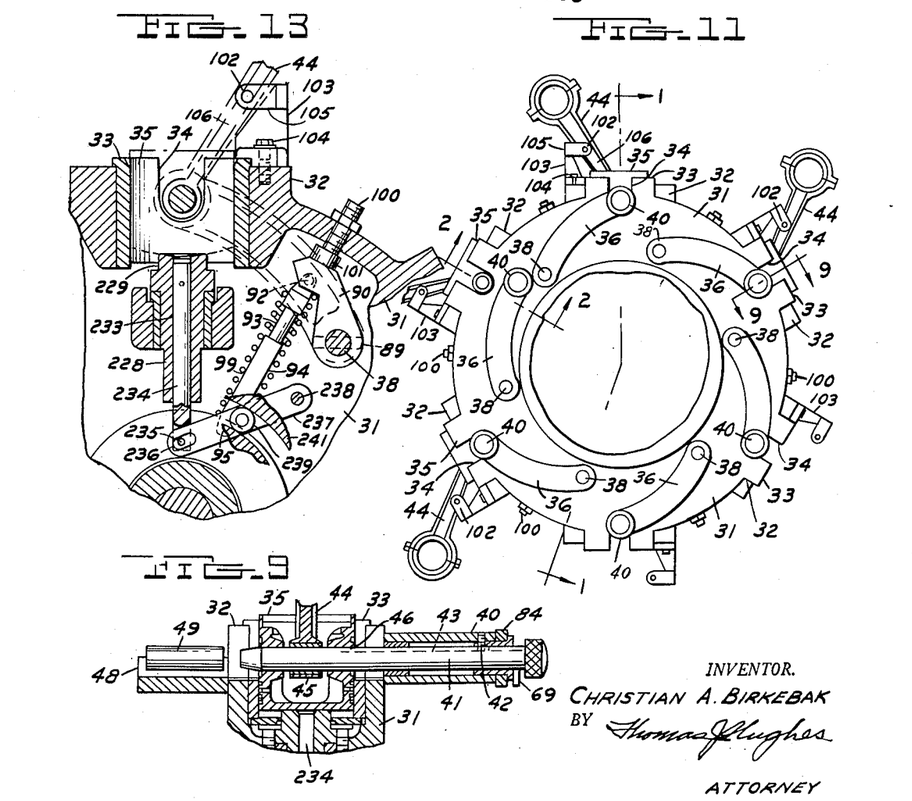
Figure 9 is an enlarged vertical sectional view taken on the line 9—9 of Fig. 11.
Figure 11 is a diagrammatic view of the work carrying wheel of my machine.
Figure 13 is an enlarged vertical sectional view taken on the line 13—13 of Fig. 1.

An arm 36, secured by pin 37 to pivot with shaft 38, is mounted adjacent each receptacle, the respective ends of the said shaft extending through the side walls 39 of the work wheel (Figs. 1 and 11). The arm 36, at its free end, carries a tubular extension 40 formed at right angles thereto. This extension is adapted to slidably retain locating pin 41 therein and is prevented from disengagement therefrom by a stop screw 42, which engages recess 43 in the aforesaid pin. At the time that the machine operator inserts a piston 35 in the receptacle, as above mentioned, he at the same time inserts a connecting rod 44 and centers bearing 45 of the latter member with the piston's wrist pin bearings 46 (Figs. 1 and 9) by manually sliding locating pin 41 through the bores of the aforementioned bearings, thus temporarily holding the rod and piston in centered position relative to each other. This procedure constitutes the initial assembly operation and takes place while the receptacle is temporarily halted for such loading. Upon completion of that operation, work wheel 31 continues to rotate and obviously the same loading procedure is followed with respect to each receptacle as it is rotated to position for the operator to perform it. When completed that and each succeeding receptacle, carrying the temporarily centered assembly, rotates or is automatically indexed to the next temporary station stop where the second assembly operation takes place.

Before proceeding with a description of the second operation, however, it must be pointed out that the opposite end of shaft 38 also carries to pivot therewith, by reason of the securing pin 37', and in unison with arm 36 carried on the opposite end, the arm 47, which latter member carries at its free end and at right angles thereto a V-shaped guide block 48 adapted to receive and hold a wrist pin 49 (Fig. 9). The latter is placed on the block 48 as a part of the first operation, above mentioned, and is reposed thereon for availability in the second assembly operation when it is pushed through and seated in the aforesaid bearings of the piston and rod, which operation will hereinafter be more fully described.

Secured to the frame 10 (Fig. 1) are the housing members 50 and 51 that form a support for the cam shaft 52 which is rotatably supported therein by the balls 53 carried in the races 54. The inner end of shaft 52 carries gear 55 to rotate therewith and to mesh through idler gear 56 with driving gear 57 to which power is imparted from shaft 19. A cam track 58 is provided in the drum 58', carried on the base of shaft 52, in which cam follower or roller 59 tracks. The latter is secured by pin 60 to the roller base 61 which is keyed at 62 and secured by bolt 63 to the ram 64 which carries the plunger 65. Thus as cam track 58 revolves, the follower 59 tracking therein is moved back and forth carrying with it the aforesaid ram and plunger.

A pusher pin 66 is threadedly engaged in the operating end of plunger 65 and is secured in place by nut 67, while to the end of pin 66 there is suitably attached the cup-shaped swivel 68 which is adapted to abut against an end of wrist pin 49. Upon reciprocation of the plunger to the right, as shown in Fig. 1, said wrist pin has been forced by said plunger into locating position in the rod bearing 45 and piston bearings 46, the entrance thereto of the wrist pin having forced the locating pin 41 to the right and out of engagement with said bearings.

Further movement of locating pin 41 to the right into arm extension 40 is effected by means of cam follower 69 carried by said pin, which follower is adapted, upon being shoved to the right as aforesaid to engage and slide along the angular face of cam 70, thus moving pin 41 clear of the walls of the receptacle support 32, for a purpose later to be described.

As ram 64 reciprocates, as aforesaid, it carries with it the guide arm 71 which is secured to the ram by bolts 72. Bolted near the upper end to member 71 is a guide pin 73, which slides in the bushing 74 of housing 75; and, to the opposite end of guide pin 73 the arm 76, carrying the dog 77 and stop pin 78, is securely fitted thereto. A bracket 79, secured to the housing 75, supports valve lever 80 that is attached to a valve (not shown). When the ram 64, carrying the guide arm 71 and guide pin 73 is reciprocated the arm 76 is carried back and forth with the latter. In the movement to the left as dog 77 strikes lever 80 the former is pivoted to the right on pivot pin 81 until clear of and beyond the point or end of lever 80. On the return stroke, dog 77 (which is now prevented from moving to the left by stop 78) hits lever 80 forcing the latter to move downward to the right, thus tripping the valve to which it is attached and causing a quantity of lubricating oil to drop from the oil line pipe 83 (partially shown, Fig. 1) on to the wrist pin, which reposed in the guide block 48, preparatory to its being pushed into position in the bearings 45 and 46 respectively of the connecting rod 44 and piston 35.

The aforesaid operations of locating the wrist pin in the bearings 45 and 46 may be termed assembly operation two and is repeated at the ram station as each receptacle is rotated thereto by the work wheel 31. Subsequent to each of these operations arm 36 and tubular extension 40 thereof, as well as arm 47 and its V-shaped guide block extension 48, upon continued rotation of the wheel, are forced downward and out of position so as to clear and leave unobstructed the spaces theretofore occupied by them adjacent the ends of the now inserted wrist pin. This retraction of the aforesaid members is effected in the following manner:

As work wheel 31 is automatically indexed (as will be described more particularly hereinafter) from the ram station aforesaid to the next station for the final assembly operation, roller 84, carried by the tubular extension 40 of arm 36, rolls against the lower surface of cam 85. The latter member is secured in the bottom of frame 86 of the coiling unit, generally indicated by the numeral 87 (Fig. 2) which unit, cooperating with a companion unit 88, constitute the final assembly station. Such units obviously are located rearwardly of the ram station. Arms 36 and 47, being doweled by pins 37 and 37' to shaft 38 to turn therewith, execute a partial downward movement upon contact of roller 84 with cam 85. Shaft 38 (Figs. 1 and 13) also has doweled to it by pin 89 the stop lever 90, as a consequence of which said lever moves simultaneously with and in the same direction as arms 36 and 47. A lateral extension 91 of the aforesaid lever is pivoted by screw 92 to the rod 93, which slidably engages within the sleeve 94. The latter member is likewise pivoted at one end to the pivot screw 95 of spring guide flange 96, which flange in turn is secured by bolts 97 to the inner face of work wheel 31. Coiled about the members 93 and 94, intermediate the spring guides 96 and 98 is the compression spring 99. Thus when arm 36 is depressed as aforesaid the turning of shaft 38, to which the member 36 and lever 90 are each doweled, causes the latter member to compress spring 99 thereby forcing rod 93 into sleeve 94, at which time pivots 92 and 95 permit lever 90 to turn with shaft 38 a sufficient distance to enable arm 36 and its companion arm 47 to be swung clear of the spaces adjacent the ends of the inserted wrist pin. Furthermore arms 36 and 47, by office of cam 85, remain in this depressed position until after the final assembly operation, hereinafter to be described, is completed at which time the end of travel of arm 36 against cam 85 is reached and spring 99 then expanding against guides 96 and 98 force lever 90 to turn shaft 38, carrying arms 36 and 47, as aforesaid, to its former position.

Continued upward travel of the arms 36 and 47 beyond the position required for centering the wrist pin in the piston and connecting rod bearings is prevented by the stop bolt 100 which is threaded to the work wheel frame 31, a stop button 101 secured in the end of lever 90 serving to abut against bolt 100.

During the assembly operations heretofore and hereinafter mentioned the work pieces (piston 35, connecting rod 44 and wrist pin 49), carried in the receptacles 33 are prevented from displacement therefrom by spring actuated snap locks 102 (Figs. 11 and 13) which are supported in the U-shaped brackets 103 secured by bolts 104 to each receptacle support 32. At the time bearing 45 of connecting rod 44 is initially centered with the piston bearings 46, connecting rod 44 is manually forced between bracket arms 105 of the member 103 against the pressure of the snap locks 102 until the latter expand into the longitudinal groove 106 in the connecting rod, thus insuring the rod against any swinging action as the work wheel rotates.

Figure 2:
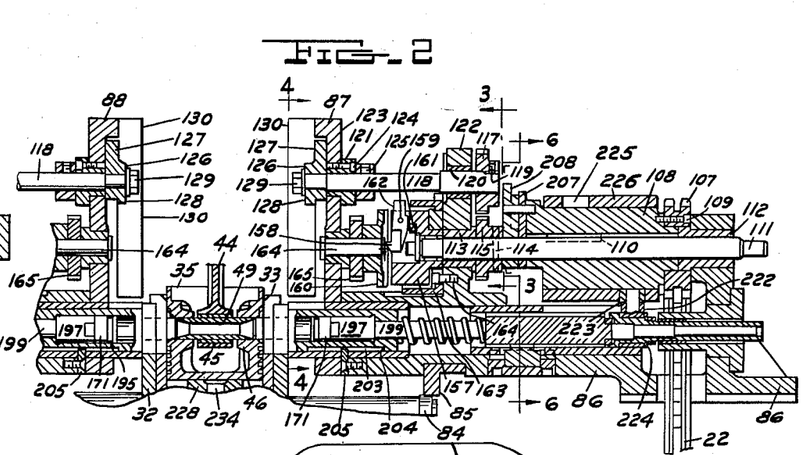
Figure 2 is a cross sectional view of the final assembly station of my machine.

Upon completion of the assembly operation at the ram station, work wheel 31 is automatically indexed so as to present the receptacle, which had just left the ram station, to the final assembly station which comprises the two coiling units 87 and 88. These units are identical in construction and mode of operation, so that a description of one obviously will cover the other. These units are suitably bolted to the main frame 10 of the machine and are positioned one index stop of the work wheel to the rear of the ram station. Also, as shown in Fig. 2, the units are situated directly opposite each other and are separated only by the work wheel so as to enable the latter in its rotation to turn each receptacle therebetween.

Figure 3:
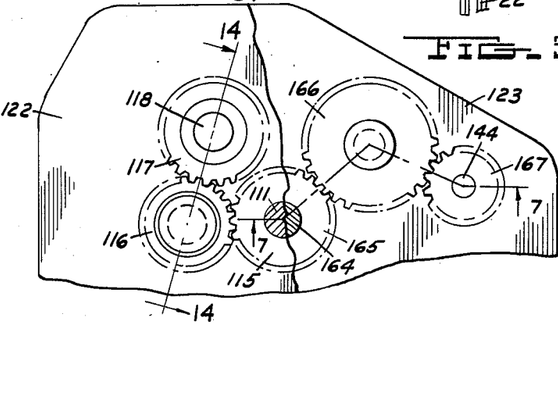
Figure 3 is an enlarged vertical sectional view taken on the line 3—3 of Fig. 2.
Figure 4:
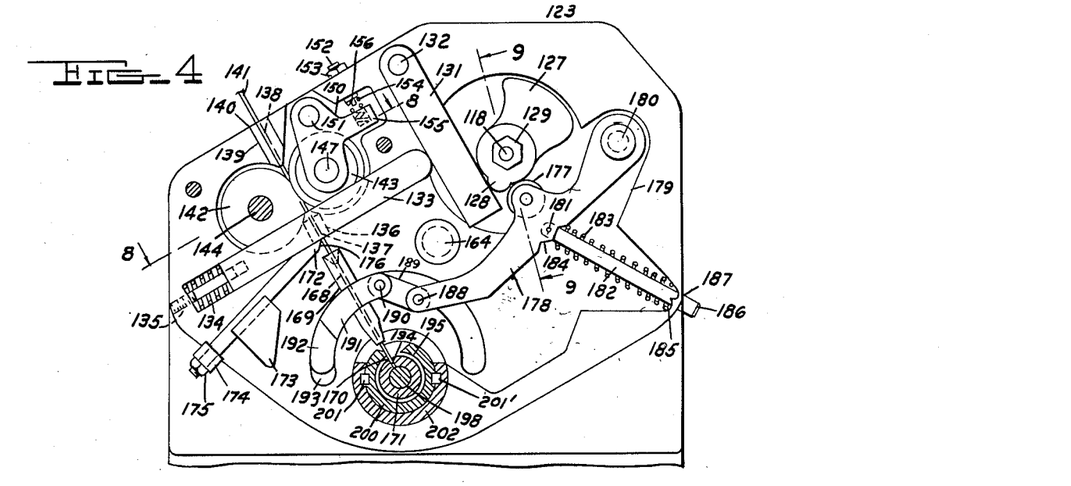
Figure 4 is a side elevation, partly in section, taken on the line 4—4 of the assembly station shown in Fig. 2.
Figure 5:
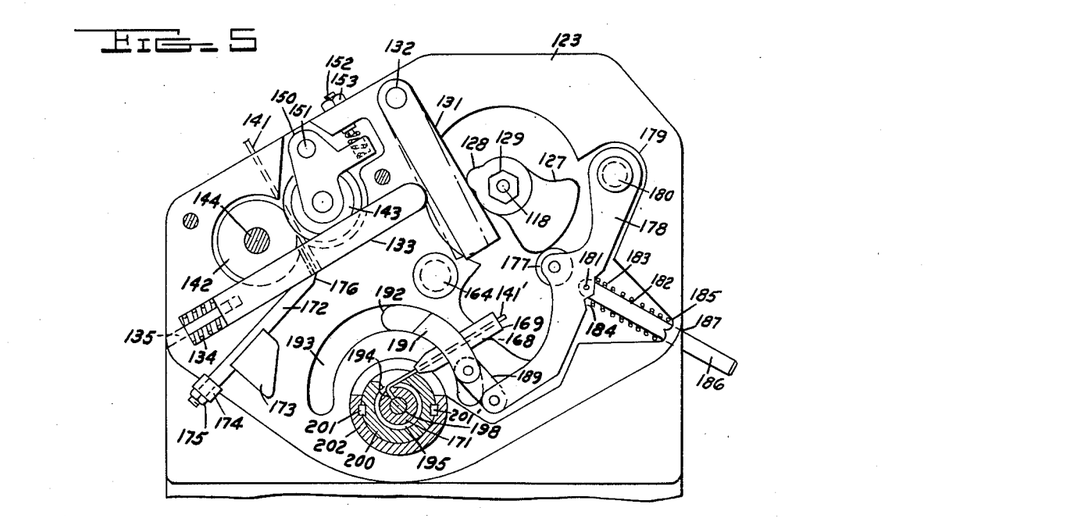
Figure 5 is a view similar to that shown in Fig. 4 but with the moving parts thereof shown in different positions.

Motion imparted from shaft 19, through sprocket 21 and chain 22 (Figs. 1 and 2) is delivered to sprocket 107. The latter is secured to the cam base 108 by bolts 109 which base in turn is keyed at 110 to shaft 111 that is journaled at its ends in bushings 112 and 113 supported in the frame 86. Pinned to shaft 111 by the dowel 114 is the drive gear 115 which meshes, through idler gear 116 (Fig. 3) with cut-off gear 117 secured to shaft 118 by the screw 119. Shaft 118 is mounted for rotation in bushings 120 and 121 that are supported respectively in the transverse frame member 122 and feeder plate 123. Bushing 121 may be secured to the member 123 in the well known manner, though I have shown it being fastened by bolt 124 and backed by stop bushing 125. A cam member 126, comprising a pair of oppositely disposed cams 127 and 128 formed therein, is keyed at one end of shaft 118 to turn therewith and is securely held thereon by nut 129 (Figs. 2, 4 and 5). A cover or feeder plate 130 is bolted to that portion of the outside face of transverse plate 123 to cooperate therewith in supporting most of the mechanism shown in Figs. 4 and 5 presently to be described.

Figure 8:
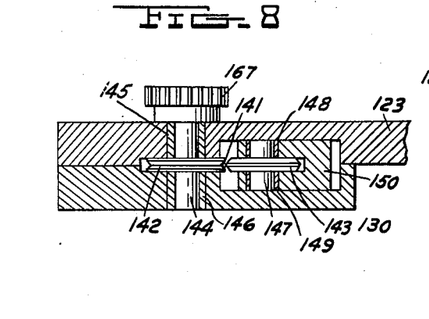
Figure 8 is a sectional view taken on the line 8—8 of Figure 4.

It will be observed (Figs. 2 and 4) that as the smaller cam 128 is rotated about shaft 118 it strikes the swivel plate 131, which pivots on pin 132, moving the plate in the direction and as indicated by the dotted lines (Fig. 5). Plate 131, thus bearing against one end of cut-off bar 133, is thereby forced to push the latter against the action of spring 134 that is coiled in the opposite end of said rod about the supporting pin 135. A carbide guide bushing 136, having a longitudinal aperture or passage 137 is inserted in the member 133 intermediate its ends. Said passage is concentric with the passage 138 in bushing 139 which is secured in opening 140 partly machined in each of the inner wall surfaces of the plates 123 and 130. A reel of wire (not shown) furnishes a supply of wire 141 to passages 137 and 138 and said wire is intermittently drawn to and through said passages by the wire feed wheel 142 cooperating with idler wheel 143. The former wheel (Fig. 8) is secured to shaft 144 and turns therewith in the bushings 145 and 146 fitted respectively in the walls of plates 123 and 130. The latter wheel is secured to turn with shaft 147 in bushings 148 and 149 retained in bracket support 150 which is mounted to pivot on pin 151 secured to plates 123 and 130. Screw 152, secured through the upper surface of plate 123, is adapted upon manipulation of nut 153, to adjust the tension in spring 154, one end of which is seated in a recess in bracket arm 155, while the opposite end is retained in end engagement with screw 152 by the retaining shank 156. By so increasing or decreasing the tension on the aforesaid spring, the bracket 150 will be swung about the pivot 151 carrying wheel 143 with it to thereby attain a suitable gripping surface by drive wheel 142 on the wire against wheel 143, which action of the wheels thus provides the desired pull of the wire through passages 138 and 137.

Figure 7:
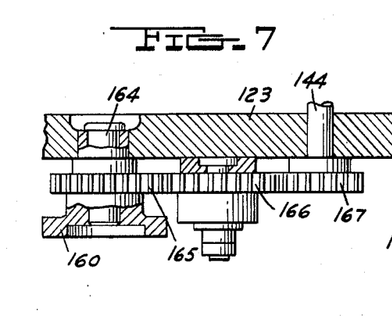
Figure 7 is an irregular horizontal sectional view taken on the line 7—7 of Fig. 3.

Intermittent rotation of the aforesaid drive wheel 142 (Figs. 2, 3 and 8) is effected from main drive shaft 111 through the dog body 157, that is keyed to said shaft, and thence to clutch dog 158 which is pivotally mounted on the pin 159 secured in said body. The said clutch dog normally is kept in engagement with clutch member 160 by the pressure exerted against it by spring 161 which is suitably disposed in said body. Thus upon rotation of the aforesaid body and dog with shaft 111, upper dog arm 162, upon contact with cam 163, which latter member is secured by bolt 164 to the cross member 122, causes the aforesaid dog to pivot upon pin 159 and thereby disengage it from the said clutch. When the latter is in engagement, as above mentioned, and being keyed to short shaft 164, it is partially turned and imparts a like movement to driving gear 165, which is also secured to said shaft to turn therewith. Finally gear 165, meshing with idler gear 166 (Figs. 3, 7 and 8) and the latter with wire feed gear 167, the power initiated in shaft 111 is transmitted to shaft 164 and thence to wheel 142. Obviously when dog 158 is disengaged from clutch member 160, wheel 142 stops rotation and feeding of the wire 141 thereby ceases until reengagement of the aforesaid clutch is again established.

The aforesaid pulling of the wire through the stated passages by the wheels 142—143 bring it beyond cut-off bar 133 where the wire then enters the longitudinal passage 168 in the wire bending fixture 169 and its proceeds therethrough until its end reaches the aperture 170, which is machined in the coiling arbor 171, at which instant cam 128, pushing against swivel plate 131 forces bar 133, carrying the wire 141, in the direction of spring 134. A wire cutting tool 172 is rigidly supported by the clamp 173 and bracket 174 that are attached to feeder plate 123. A nut 175, secured to the bracketed end of said tool, is provided for longitudinal adjustment of the latter. In consequence of the lateral movement of the wire 141, above referred to, it is forced against the cutting edge 176 of the tool and is thus severed from the wire stock. Immediately subsequent to that cutting operation, continued rotation of small cam 128 permits arm 131 to resume the full line position shown in Fig. 5, at which time bar 133, due to the action of spring 134, is returned to its normal position.

Simultaneously with the completion of the wire cutting operation, as large cam 127 is also secured to and turns on the same shaft as small cam 128, the larger cam is rotated to assume the position shown in Fig. 5 when it contacts roller 177 pinned to the arm 178. The latter is positioned in a non-geometrical recess 179 machined in plate 123, and is pivoted therein for swinging movement about the shaft 180 and is also connected by pivot pin 181 to the plunger 182. Coiled about the latter member is a spring 183, the ends of which are retained in seats 184 and 185 provided respectively in arm 178 and plate 123. Thus pressure exerted by cam 127 on roller 177 forces arm 178, carrying the pivoted plunger 182, back against the action of spring 183 compressing the latter and forcing the plunger end 186 to slidably extend through an aperture 187 provided in plate 123.

The opposite end of arm 178 is pivotally connected by means of the pin 188 to link 189, and a pin 190 in the opposite end of the latter pivotally connects it to the arcuate retainer 191 that is secured to the arcuate slide 192 which is adapted for sliding movement in the semi-circular guideway 193. Consequently as wire bending fixture 169 is rigidly secured intermediate members 191 and 192, so as to be moved therewith, upon the severance of wire 141 as aforesaid, and the pull exerted on link 189 and retainer 191 by arm 178, the said fixture will be forced to execute a clockwise movement through approximately a ninety degree arc, as shown by the relative positions thereof exhibited in Figs. 4 and 5.

End 194 of the severed piece of wire 141, having previously been seated in the hole 170 of the coiling arbor prior to the wire cutting operation aforementioned is, in consequence of the said clockwise swinging of the wire bending fixture 169, bent at a right angle to the longitudinal axis of the major portion of the severed wire to thereby provide a firm grip in the said hole.

A groove 195, machined circumferentially in the outer surface of coiling arbor 171, has its ends terminating in the outer end of hole 170 to thereby provide a means for forming the major portion of the severed wire into a wrist pin retaining ring 196 (Fig. 10), the manner and complete means of forming which presently will be described.

Coiling arbor 171 (Figs. 2 and 12) is fitted by key 197 and secured by screw 198 to plunger shaft 199. The arbor and plunger as thus united act as a unit which is adapted to oscillate as well as reciprocate within the coiling sleeve 200, while the latter member by reason of keys 201 and 201' is adapted for longitudinal sliding only in bushing 202 (Fig. 4). A recess 203 is exteriorly machined in said sleeve, the vertical wall 204 of which serves as a stop upon forward sliding contact thereof with key 205. The latter member is secured by screw 206 to the frame 86 and extends through an aperture in bushing 202 into said recess.

Figure 6:
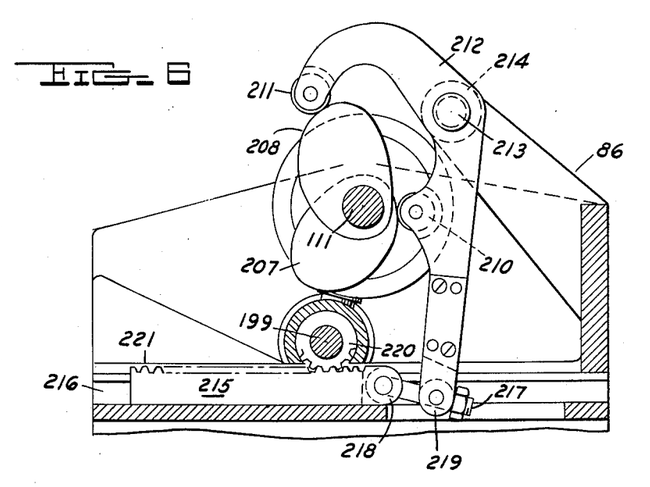
Figure 6 is an enlarged side elevation, partly in section, taken on the line 6—6 of Fig. 2.
Figure 10:
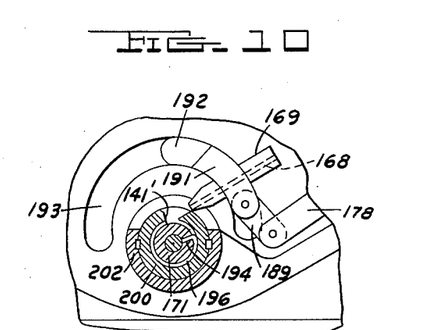
Figure 10 is a fragmentary vertical view, partly in section, of the wire coiling mechanism shown in the bottom central portions of Figs. 4 and 5.

Oscillation of arbor 171, the progressive movements of which are shown in Figs. 4, 5 and 10, is accomplished by reason of the fact that advancing cam 207 and return cam 208 (Figs. 2 and 6) are secured to and rotate with the main drive shaft 111 of the coiling unit. These cams when thus rotated bear respectively against roller 210 and roller 211, carried by the lever 212 which pivots on shaft 213 that is supported in the bushing 214 secured in the frame 86. In consequence of this cam action the lower portion of lever 212 is swung back and forth carrying with it rack 215, which is thereby reciprocated in the guideway 216 by reason of the adjustable screw connection 217, which is secured in trunnions 218 and 219 respectively attached to said lever portion and rack. As the latter is positioned transversely of the axis of plunger shaft 199, to which pinion 220 is keyed, the teeth 221 of the rack meshing with the pinion teeth cause shaft 199 to be rocked back and forth on its axis. Thus as wire coiling arbor 171 is keyed to and turns with said shaft, severed wire 141' is turned about the arbor into and along the groove 195 and thereby formed into the retaining ring 196, as shown in Fig. 10, after which action cam 208, acting in the manner above described, returns arbor 171 to the position shown in Fig. 4.

Following the formation of the retaining ring, shaft 199 carrying arbor 171 as aforesaid is reciprocated toward and away from piston 35 (Fig. 2). Such movement is effected by reason of the fact that the cam follower 222, carrying roller 223, is attached to said shaft by means of nut 224, and as the said roller is retained in rolling engagement with the track 225 of cam 226 (the drum 103 of which is keyed to the drive shaft 111) the rotation of said cam will cause the follower to reciprocate shaft 199.

Figure 12:
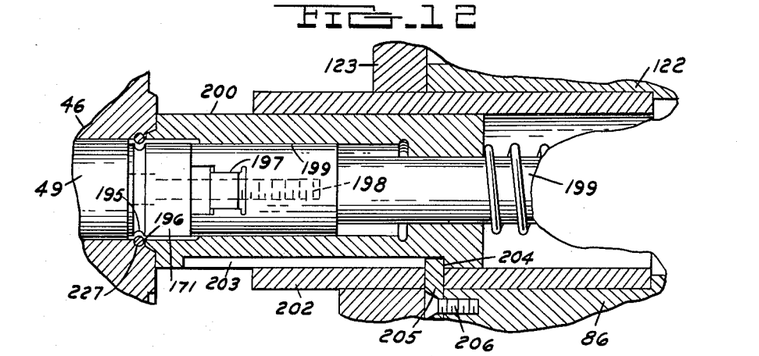
Figure 12 is an enlarged vertical sectional view of the wire forming and feeding mandrel shown in the lower central part of Fig. 2.
Figure 14:
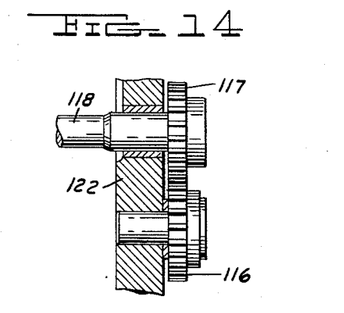
Figure 14 is an enlarged sectional view taken on the line 14—14 of Fig. 3.

When the latter is thus moved forward the wrist pin retaining ring 196, which theretofore had been retained in pressed engagement in the groove 195 by the sleeve 200, is slid toward the wrist pin 49, now positioned in the respective piston bosses 46 (Fig. 12). When the ring reaches the internal annular groove 227 in the said boss it springs free of arbor groove 195 and seats itself in the groove 227, after which shaft 199 and its attached arbor are retracted for repeat operations on subsequently delivered work pieces.

As previously mentioned, there being two opposed coiling units for simultaneously forming a pair of rings 196, and then forcing the same into end engagement in grooves 227 of the piston bosses 46 for the retention of the wrist pins therein, obviously the description just given of one of those units applies in every detail to the other. Also the insertion of the two retainer rings 196 in end engagement with the wrist pin aforesaid completes the final assembly of the wrist pin to the connecting rod 44 and piston 35 at which time work wheel 31 is again automatically indexed, moving therewith the receptacle 33, containing the assembled work, away from the coiling station to be replaced thereat by the succeeding receptacle. In consequence of this movement the first mentioned receptacle, following its circuitous path, has been turned to a position below the horizontal axis of the work wheel but approximately midway between the latter and the vertical axis of said wheel. Thus the receptacle has been turned almost up-side down and upon reaching this latter position the assembled work aforementioned is ejected from the receptacle in the manner presently to be described.

Each work holding receptacle 33 is fitted with a guide bushing 228 (Figs. 1 and 13) the upper end of which extends through an aperture 229 of the receptacle and its respective support. Screws 230, the heads 231 of which clampingly engage the shoulders 232 of said bushing and the bottom of the receptacle, rigidly secure these members to work wheel 31. A slideway 233, extending longitudinally of said bushing is provided therein for the intermittent reciprocating movements of ejector rod 234. The lower end of the latter extends beyond the said bushing and to its extreme end a pin 235 is secured for slidable contact in slot 236 provided in one end of lever 237. The opposite end of the latter is pivotally secured on shaft 238 carried in wheel 31. Intermediate said slot and shaft, lever 237 carries cam roller 239 which is adapted to roll in the pear shaped cam track 240 of cam plate 241. Thus after each assembly of the parts aforementioned is completed at the coiling station and the work carrying receptacle is moved therefrom, the cam tracking of roller 239 aforesaid causes the latter to tilt the slotted end of lever 237 upward about the pivot point of shaft 238, shoving the ejector rod upward against the dome of piston 35 to thereby force it out of the work receptacle 33. The force of this upward thrust is also sufficient to dislodge the connecting rod 44 from its locked engagement with snap lock 102.

Throughout the operation of my machine as aforesaid, the automatic indexing of the work wheel 31 for the presentation of the work receptacles to the assembly or work stations is produced by means of the Geneva indexing arm 24, through the indexing pin 25 and roller 26, which arm upon rotation is adapted to turn Geneva wheel 28 by engaging the slots 27 therein and thereby turning the tubular shaft 29 to which the work wheel 31 is securely keyed. As heretofore mentioned, each work receptacle, of which I employ six, being inserted in and bolted to the support 32, is a rigid part of the work wheel, in consequence of which they rotate with the wheel. Therefore, a description of the rotational progress of one covers the others.

Each receptacle proceeds through its circuitous travel to and from the aforementioned work stations and is halted for a few seconds at each station so that the assembly work above described may be completed. To effect these temporary stops, I employ the following means:

A cam base 242 (Fig. 1) keyed to drive shaft 19, carries cam 243, the track 244 of which is adapted to engage cam roller 245. The latter is supported by the pin 246, which is secured by screw 247 in the slide 248. An index pin 249 is secured in said slide by the dowel pin 250. Consequently upon rotation of cam track 244, by reason of the power imparted to it from shaft 19, the cam follower 245 is forced to execute a backward and forward movement, thereby reciprocating index pin 249 in guideway 251 for temporary engagement in one of the apertured stops 252 that are circuitously disposed in the outer wall surface of wheel 31. When index pin 249 is thus slidably engaged in one of said stops it holds the wheel 31 from turning for a matter of three seconds, the time allowed for each work station to complete its particular operation in the assembly of the piston parts, or of assemblies of like nature.

Considering the operations in their inverse order and viewed from the standpoint that a complete assembly has been made of one set of work parts, when the work wheel has been so stopped for the ejection of the completed work, a receptacle is also halted at the coiling station, the ram station and at the loading station. Therefore simultaneously with the ejection operation there is taking place: At the coiling station, the insertion of the wrist pin retainer rings; at the ram station, the insertion of the wrist pin; and, at the loading station, the manual loading of the work parts, these operations being repeated as long as working parts are fed to the receptacles.

It is now obvious that I have produced an automatic power driven machine for the mass production of assembled automotive parts, which machine is highly efficient and simple in its ease of operation. Although I have shown and particularly described the prefered embodiment of this invention, I do not wish to be limited to the exact construction shown, as various changes in the form and relation of the parts thereof may readily be made without departing from the spirit of this invention, as set forth in the appended claims.

I claim:

1. The combination in a machine for automatically assembling pistons to connecting rods, said machine having a plurality of spaced work stations consisting of a loading, a ramming and a wrist pin retaining ring forming and applying station, of a wheel having a plurality of radially disposed receptacles, each adapted to carry a piston and connecting rod with the open end of the piston skirt exposed, means carried by each receptacle to hold a connecting rod having its wrist pin bearing end inserted in the open skirt of each piston intermediate the bosses of the latter, means carried by said wheel adjacent each receptacle adapted to support a wrist pin in axial pre-alignment with the bores of said bearing and bosses, driving mechanism including an intermittent drive for rotating said wheel to bring said receptacles with the work pieces carried thereby successively into alignment with the said work stations, means operated by said driving mechanism in timed relationship therewith for holding said wheel with the receptacles thereof in said alignment with said work stations, a plunger at said ramming station for automatically forcing said wrist pin into said piston bosses and connecting rod bearing, mechanism at said ring forming and applying station for automatically forming and inserting a ring in each of said bosses adjacent the respective ends of said wrist pin, means operated by said driving mechanism in timed relationship therewith for actuating said plunger, and additional means also operated by said driving mechanism in timed relationship therewith for actuating said ring forming and inserting mechanism.

2. The combination in a machine for automatically assembling pistons to connecting rods, said machine having a plurality of spaced work stations consisting of a loading, a ramming and a wrist pin retaining ring forming and applying station, of a wheel having a plurality of radially disposed receptacles, each adapted to carry a piston and connecting rod with the open end of the piston skirt exposed, means carried by each receptacle to hold a connecting rod having its wrist pin bearing end inserted in the open skirt of each piston intermediate the bosses of the latter, means mounted adjacent each receptacle adapted to carry a wrist pin, means pivotally mounted with said last mentioned means adapted to be manually actuated therewith at the loading station to preliminarily locate upon a common axis the bore of said pin with the bores of the piston bosses and rod bearing, driving mechanism including an intermittent drive for rotating said wheel to bring said receptacles with the work pieces carried thereby successively into alignment with the said work stations, means operated by said mechanism in timed relationship therewith for holding said wheel with the receptacles thereof in said alignment with said work stations, a plunger at said ramming station actuated by said driving mechanism in timed relationship therewith for forcing said wrist pin into said piston bosses and connecting rod bearing; and mechanism, at said ring forming and applying station, operated by said driving mechanism in timed relationship therewith for cutting and forming and inserting a ring in each of said bosses adjacent the respective ends of said wrist pin.

3. The combination in a machine for automatically assembling pistons to connecting rods, said machine having a plurality of spaced work stations consisting of a loading, a ramming and a wrist pin retaining ring forming and applying station, of a wheel having a plurality of radially disposed receptacles, each adapted to carry a piston and connecting rod with the open end of the piston skirt exposed, means carried by each receptacle to hold a connecting rod having its wrist pin bearing end inserted in the open skirt of each piston intermediate the bosses of the latter, means mounted adjacent each receptacle adapted to carry a wrist pin, means pivotally mounted with said last mentioned means adapted to be manually actuated therewith at the loading station to preliminarily locate upon a common axis the bore of said pin with the bores of the piston bosses and rod bearing, driving mechanism including an intermittent drive for rotating said wheel to bring said receptacles with the work pieces carried thereby successively into alignment with the said work stations, means operated by said mechanism in timed relationship therewith for holding said wheel with the receptacles thereof in said alignment with said work stations; said ramming station having a plunger actuated by said driving mechanism in timed relationship therewith for forcing each wrist pin into engagement with said piston bosses and rod bearing; said ring forming and applying station having cam actuated feeders supplying predetermined lengths of wire and cam actuated arbors adapted to receive and form said wire lengths into rings and to force the latter into retaining engagement in said bosses adjacent the respective ends of said wrist pins; and, means operated by said driving mechanism for synchronously controlling the movements of said cam actuated members with the movements of said wheel.

4. The combination in a machine for automatically assembling pistons to connecting rods, said machine having a plurality of spaced work stations consisting of a loading, a ramming and a wrist pin retaining ring forming and applying station, of a wheel having a plurality of radially disposed receptacles, each adapted to carry a piston and connecting rod with the open end of the piston skirt exposed, means carried by each receptacle to hold a connecting rod having its wrist pin bearing end inserted in the open skirt of each piston intermediate the bosses of the latter, means mounted adjacent each receptacle adapted to carry a wrist pin, means pivotally mounted with said last mentioned means adapted to be manually actuated therewith at the loading station to preliminarily locate upon a common axis the bore of said pin with the bores of the piston bosses and rod bearing, driving mechanism including an intermittent drive for rotating said wheel to bring said receptacles with the work pieces carried thereby successively into alignment with the said work stations, means operated by said driving mechanism in timed relationship therewith for holding said wheel with the receptacles thereof in said alignment with said work stations; said ramming station having a plunger actuated by said driving mechanism in timed relationship therewith for forcing each wrist pin into engagement with said piston bosses and rod bearing; said ring forming and applying station having cam actuated feeders supplying predetermined lengths of wire and cam actuated arbors adapted to receive and form said wire lengths into rings and to force the latter into retaining engagement in said bosses adjacent the respective ends of said wrist pins; a cam actuated pin movable through each of said receptacles for ejecting the assembled units therefrom; and means operated by said driving mechanism for synchronously controlling the movements of said cam actuated members with the movements of said wheel.

5. In a machine for automatically assembling wrist pins to pistons and connecting rods the combination of, a rotatable work wheel adapted to carry sets of said parts in spaced-apart receptacles provided in the rim of said wheel; driving mechanism including an intermittent drive for rotating said wheel to successively bring each of said parts to predetermined stops along its cyclatory path of travel; a plunger, operated by said driving mechanism in timed relationship therewith, at one of said stops along said path for forcing each wrist pin into the bosses and bearing of its companion piston and rod; and mechanism, operated by said driving mechanism in timed relationship therewith, at another of said stops rearwardly of the first mentioned stop along said path for forming and inserting a ring in retaining engagement in each of said bosses adjacent the respective ends of said wrist pin.

6. In a machine for automatically assembling wrist pins to pistons and connecting rods the combination of, a rotatable work wheel adapted to carry sets of said parts in spaced-apart receptacles provided in the rim of said wheel; driving mechanism including an intermittent drive for rotating said wheel to successively bring each of said sets to predetermined stops along its cyclatory path of travel; a plunger, operated by said driving mechanism in timed relationship therewith, at one of said stops along said path for forcing each wrist pin into the bosses and bearing of its companion piston and rod; and identical units, simultaneously operated by said driving mechanism in timed relationship therewith, each facing opposite sides of said wheel at another of said stops rearwardly of the first mentioned stop for simultaneously forming and inserting a ring in retaining engagement in each of said bosses adjacent an end of said wrist pin.

7. In a machine for automatically successively assembling wrist pins to pistons and connecting rods the combination of, an intermittently rotatable wheel having a plurality of radially disposed receptacles each carrying a piston and connecting rod with the wrist pin bearing end of the latter inserted in the open skirt of each piston intermediate the bosses of the pistons; means carried by said wheel adjacent each receptacle adapted to support the wrist pin laterally of and in axial alignment with the bores of said bearing and bosses; a ramming station, including an automatic plunger for forcing the wrist pin into said bores, laterally disposed along the path of rotation of said wheel; twin wrist pin retaining ring forming and applying stations spaced rearwardly of the ramming station along said path and directly opposite each other, one adjacent each side of said wheel, each station having automatic means for successively and simultaneously cutting and forming retaining rings and automatic means for simultaneously forcing a ring into each piston boss adjacent the respective ends of the wrist pin; driving mechanism, including an intermittent drive, for rotating the wheel to present successive sets of the parts to be assembled in sequential registration opposite the ramming and intermediate the twin stations; and means operated by said driving mechanism in timed relationship therewith for actuating said plunger and additional means also operated by said driving mechanism in timed relationship therewith for actuating each of said automatic means to effect the assembly of said parts.

8. In a machine for automatically successively assembling wrist pins to pistons and connecting rods the combination of, a wheel having a plurality of radially disposed receptacles, each carrying a piston and connecting rod with the wrist pin bearing end of the latter inserted in the open skirt of each piston intermediate the bosses of the piston, means carried by said wheel adjacent each receptacle adapted to be manually actuated to support a wrist pin laterally of the bores of said bearing and bosses and in axial alignment therewith, driving mechanism including an intermittent drive for rotating said wheel, ramming mechanism actuated by said driving mechanism in timed relationship therewith for forcing the wrist pin into said bearing and bosses, a pair of identical ring forming and applying units disposed beyond the ramming mechanism along the path of rotation of the wheel and directly opposite each other at opposite sides of the wheel, said units each including mechanism, simultaneously actuated by the driving mechanism in timed relationship therewith, for forming rings and forcing the latter into retaining engagement in said bosses adjacent an end of each wrist pin.

9. In a machine for automatically successively assembling wrist pins to pistons and connecting rods the combination of, a wheel having a plurality of radially disposed receptacles, each carrying a piston and connecting rod with the wrist pin bearing end of the latter inserted in the open skirt of each piston intermediate the bosses of the piston, means carried by said wheel adjacent each receptacle adapted to be manually actuated to support a wrist pin laterally of the bores of said bearing and bosses and in axial alignment therewith, driving mechanism including an intermittent drive for progressively rotating said wheel to predetermined stops, means operated by said driving mechanism in timed relationship therewith for temporarily holding said wheel during each stop, ramming mechanism actuated during each stop by said driving mechanism in timed relationship therewith for forcing the wrist pin from its support into the bore of said bearing and bosses, identical ring forming and applying units housed in said machine in facing relationship to each other but on opposite sides of said wheel and spaced rearwardly of the ramming station along the path of rotation of the wheel, said units each including mechanism, simultaneously actuated by the driving mechanism in timed relationship therewith, for forming rings and forcing the latter into retaining engagement in said bosses adjacent the respective ends of each wrist pin.

CHRISTIAN A. BIRKEBAK.

REFERENCES CITED

The following references are of record in the file of this patent:

UNITED STATES PATENTS

| Number | Name | Date |
| --- | --- | --- |
| 1,192,631 | Hick | July 25, 1916 |
| 1,386,372 | Singer et al. | Aug. 2, 1921 |
| 1,448,868 | Rollins | Mar. 20, 1923 |
| 1,526,716 | Neunherz | Feb. 17, 1925 |
| 1,887,885 | Forster | Nov. 15, 1932 |
| 1,943,452 | Nolan | Jan. 16, 1934 |
| 2,052,356 | Long | Aug. 25, 1936 |
| 2,214,025 | Larson | Sept. 10, 1940 |
| 2,390,596 | Larsen | Dec. 11, 1945 |